Inventors.
Kurt B. Bredtschneider, &
John P. Magos.

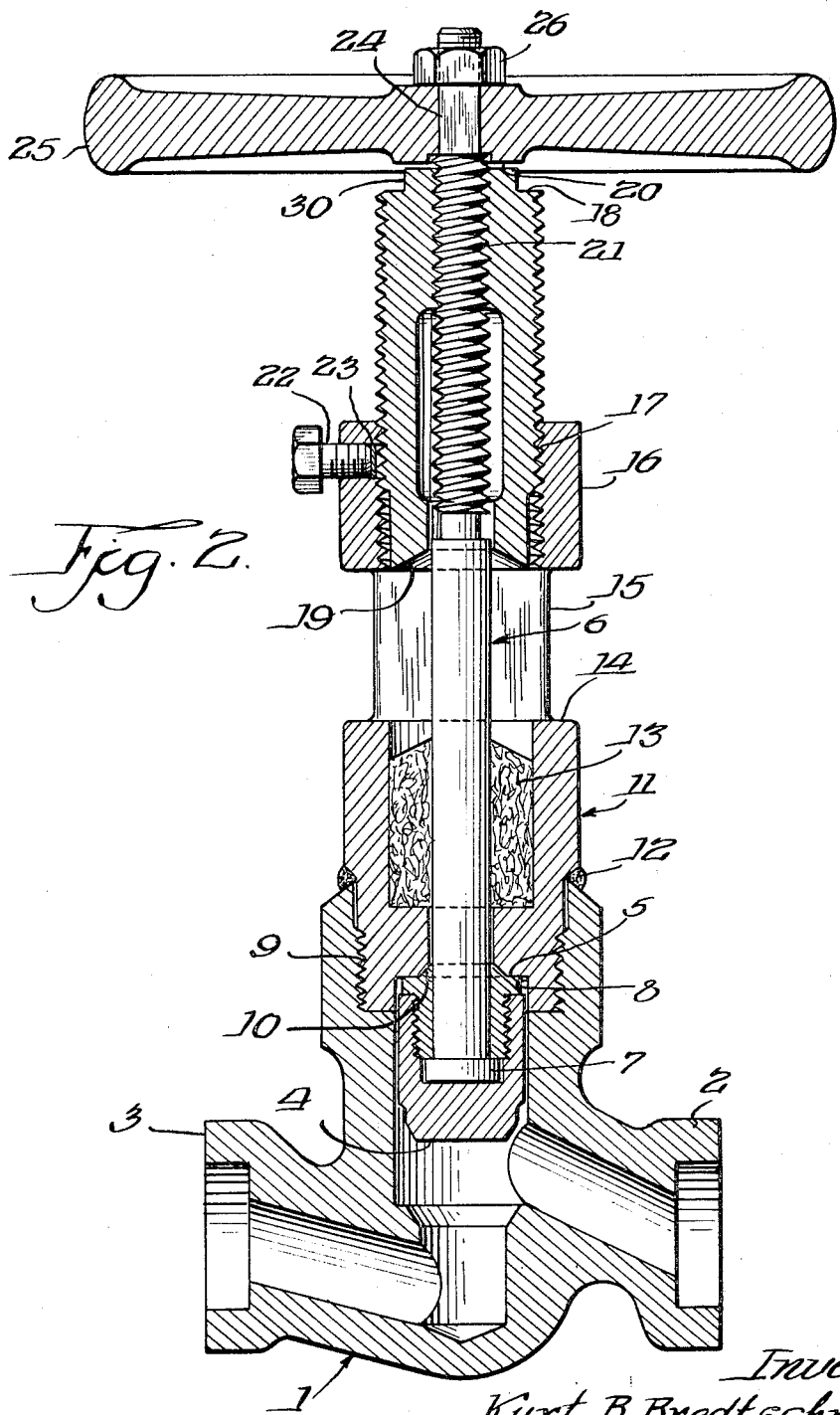

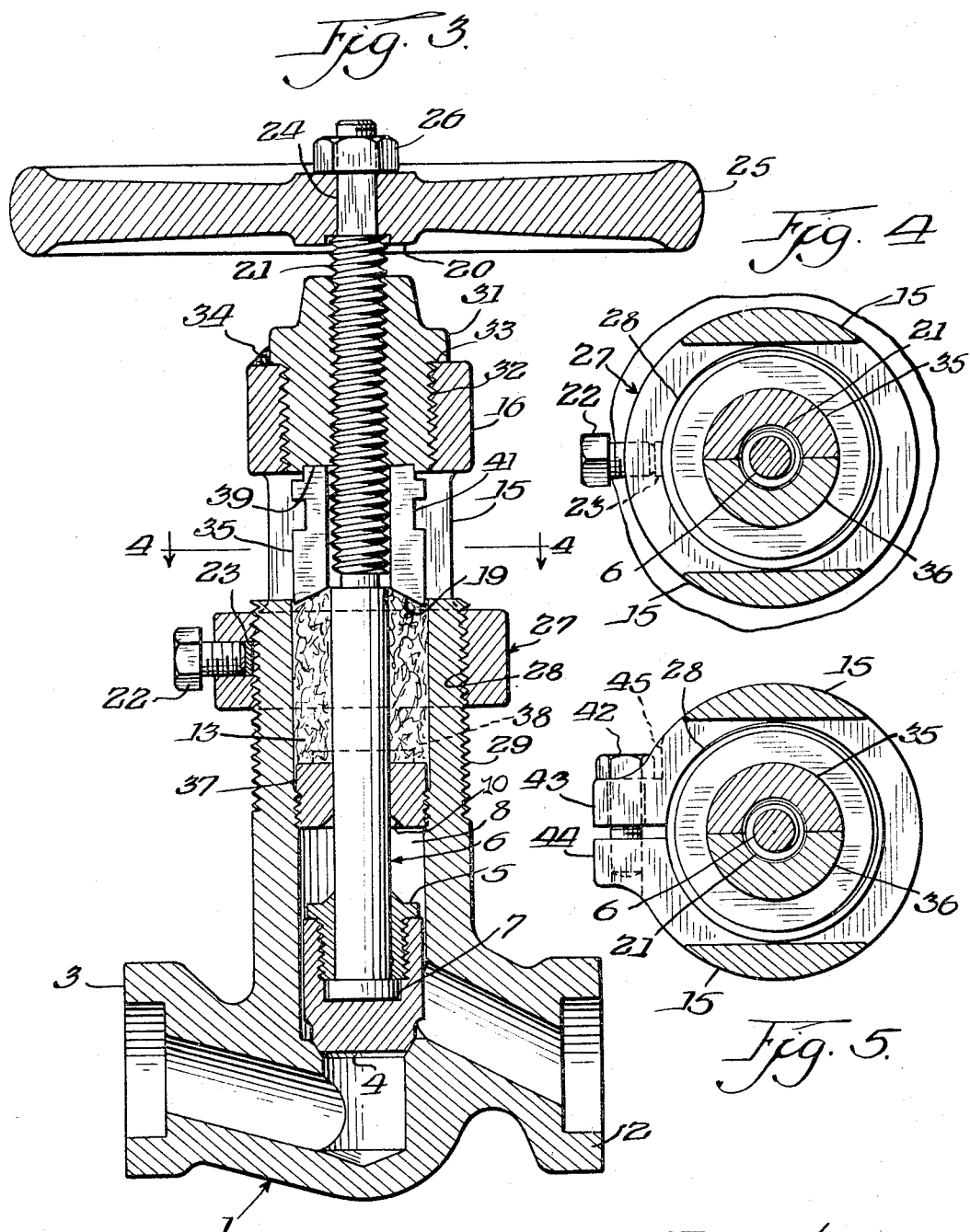

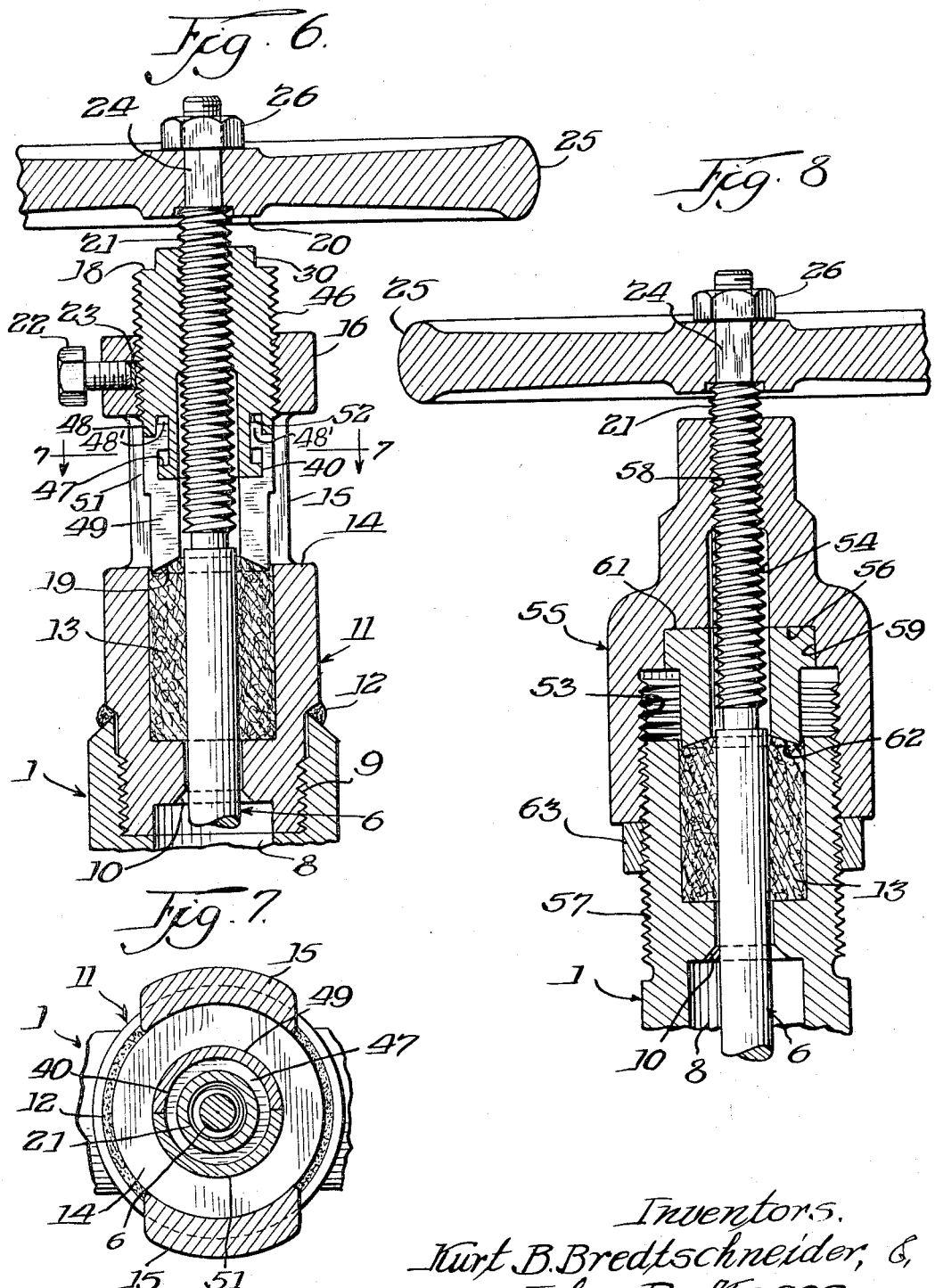

United States Patent Office 3,295,856
Patented Jan. 3, 1967

3,295,856
STUFFING BOX ARRANGEMENT FOR VALVES
Kurt B. Bredtschneider, Chicago, and John P. Magos, Wilmette, Ill., assignors to Crane Co., Chicago, Ill., a corporation of Illinois
Filed Dec. 13, 1963, Ser. No. 330,404
5 Claims. (Cl. 277—111)

This invention relates generally to a valve construction, and, more specifically, it is concerned with a novel stuffing box arrangement for valves and the like.

At the outset, in order to have a better appreciation of the merits of this contribution, it should be understood that heretofore the use of eye bolts or stud bolts for compressing packing in stuffing boxes has been employed. On small valves especially, such construction has the disadvantage that the bolts used for such purpose can easily be overstressed and damaged and might even lead to serious injury to valve parts, such as the gland flange.

Another objection to former constructions has been that with the employment of two gland bolts for such purpose uniform compression of the packing is difficult to obtain.

An additional objection to the former constructions lies in the requirement that the yoke arms employed must necessarily be unusually high or extended in order to permit lifting the gland flange and gland sufficiently to provide the required space necessary for repacking the stuffing box.

It is therefore one of the more important objects of this invention to provide for a sturdy, compact, and economical stuffing box arrangement for valves and the like in which these objections are overcome.

One of the more important objects of the invention lies in providing a construction in which the gland-like stem bushing carrying the threads for engagement by the valve stem is movable axially with a threaded connection having the same lead and number of threads per inch as the valve stem employed.

A further object is to provide that such threaded stem bushing carrying the valve stem preferably has an integral gland and contacts the stuffing box packing and permits tightening the stuffing box packing without affecting the position of the valve spindle axially.

Another advantages lies in the provision for conveniently locking the said stem bushing in predetermined axial position with respect to the yoke or valve bonnet after the desired adjustment of stuffing box packing has been obtained.

Another outsanding advantage of this construction is that it permits the stuffing box tightening means to be located substantially removed from the source of heat within a high temperature piping system.

Other objects and advantages wil become more readily apparent upon proceeding with the following description read in light of the accompanying drawings, in which:

FIG. 2 is a similar view except that the valve closure member is shown in the wide open position and with the closure member in the back-seated position;

FIG. 3 is a sectional assembly view of a modified form of the invention;

FIG. 4 is a fragmentary transverse sectional view taken on the line 4—4 of FIG. 3;

FIG. 5 is a fragmentary transverse sectional view of a modified form of the invention employing a novel locking mechanism for the yoke;

FIG. 6 is a further modified form embodying our invention;

FIG. 7 is a transverse sectional view taken on the line 7—7 of FIG. 6; and

FIG. 8 is a further modified form of the invention.

Similar reference numerals refer to similar parts throughout the several views.

Figure 1:
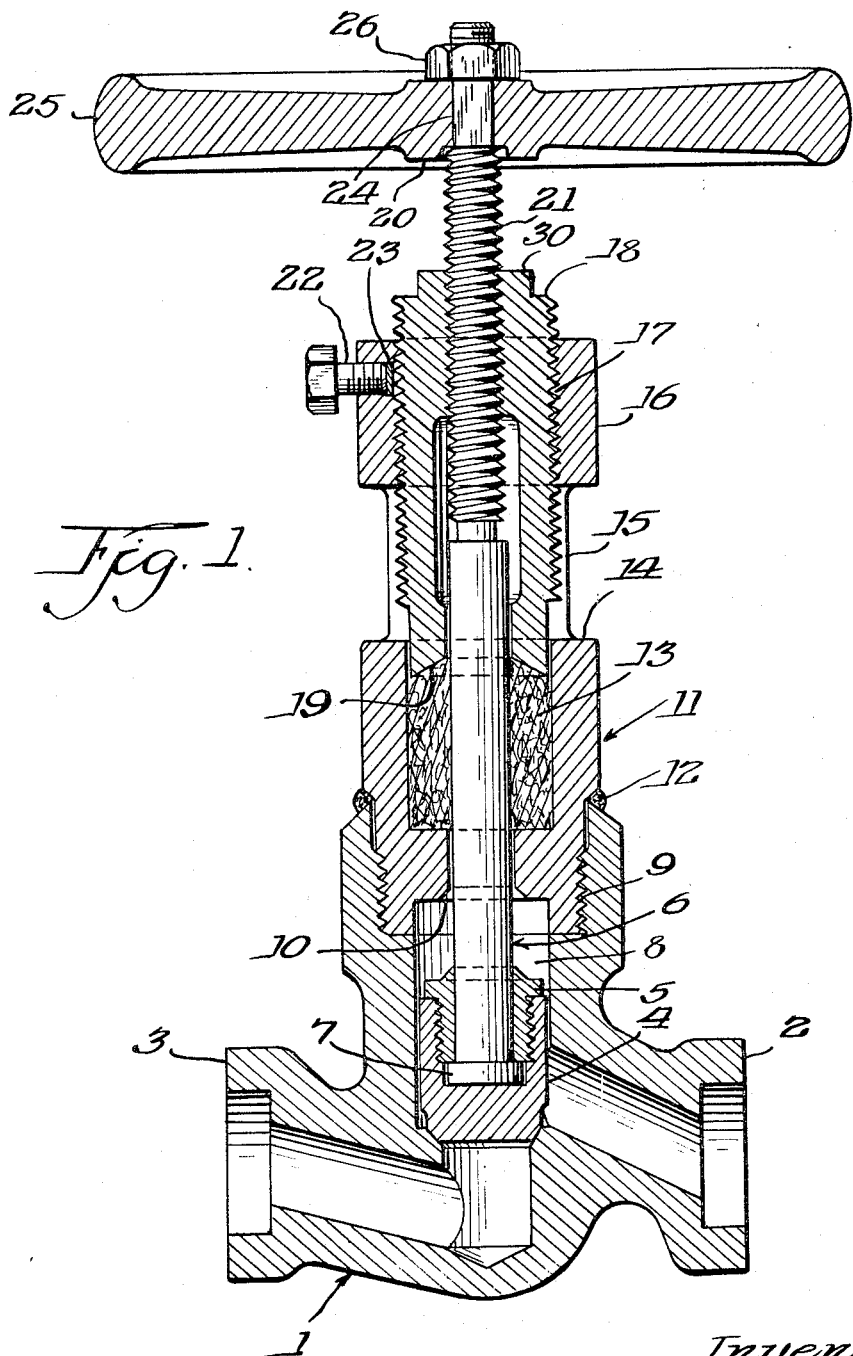
FIG. 1 is a sectional assembly view of a valve embodying our invention with the valve disc or closure member illustrated in the closed position.

Referring now to FIG. 1, a conventional globe valve generally designated 1 is shown, having the usual connecting ends 2 and 3 for attachment to a pipe line (not shown) and having the reciprocally movable closure member 4 attached by any suitable means, such as the disc stem ring 5 to the valve stem 6 by means of the button-head connection 7. It will be apparent that by raising and lowering the valve stem 6, the opening and closing functions of the valve are accomplished. At the upper portion of the valve body chamber 8, an enlarged portion as at 9 is threaded to receive the yoke 11, the latter member being preferably, but not necessarily, weld-sealed as at 12. At a median portion of the yoke 11, a conventional stuffing box for packing 13 is provided to prevent leakage past the valve stem during the course of service. Immediately above the stuffing box chamber limits upon the outer portion 14 of the yoke 11, a pair of oppositely disposed yoke arms 15 (only one of which is shown) are provided to support the integral yoke hub 16. Threadedly journalled as at 17 within the hub portion 16, a yoke bushing 18 bears at the inner or lower limits thereof as at 19 against the stuffing box packing within the chamber 13 for the usual purpose of compressing the said packing.

The stem 6 is threaded as at 21 within the yoke bushing 18 and for reasons hereinafter explained, such threads have the same lead or number of threads per inch as the threads 17 of the stem bushing. In order to selectively lock the member 18 against rotation, a locking screw 22 is employed which bears at its inner end portion against the outer periphery of the threads 17 during the locking operation, as illustrated. Preferably, a soft washer 23 is interposed between the screw member 22 and the threads 17 in order to avoid serious damage or deformation to the threads 17.

The upper limits of the stem 6 are provided with the usual polygonal portion 24 for receiving the handwheel 25, the latter member being securely held against the handwheel to retain it firmly on the stem by means of the handwheel nut 26.

FIG. 2 shows the same valve, except that the valve closure member 4 is indicated to be in the wide open position with the stuffing box 13 ready to be repacked or repaired by allowing for the closure member disc stem ring 5 to be backseated as indicated at 10 and thereby avoiding substantial leakage into the stuffing box during such repacking operation.

In this construction, the length of the valve stem 6 is so dimensioned that repacking is only possible during the backseated position of the valve stem as shown whereby the handwheel thus functions as a stop to prevent disengagement of the outside bushing threads 17 as indicated at 20. It will be appreciated that the lead on the stem threads at 21 coincide with the thread 17 of the yoke bushing 18 so that rotation of the said bushing to tighten the stuffing box does not move or affect the axial position of the valve stem. When the desired position of compression or adjustment has been obtained between the yoke bushing 18 and the packing within the chamber 13, it is thus a simple matter to tighten the lock screw 22 to contact the bushing 18 in the manner illustrated to lock and maintain the desired position of the yoke bushing against the packing as at the surface 19 in FIG. 1.

While a form of construction has been previously described in which the yoke is fixedly mounted relative to the casing or body 1, it will be appreciated that the invention is not so limited, and in this connection, attention is now directed to the modified form shown in FIG. 3, in which the valve yoke generally designated 27 is engaged by means of the threads 28 with outer threads 29 on the valve casing 1. The yoke as previously described in connection with FIGS. 1 and 2 in this case is also provided with the oppositely disposed arms 15 (only one of which is shown), but at its upper portion is provided with the yoke hub 16, receiving the yoke bushing 31, the latter member being fixed against axial movement upon the threads 32 and shouldered as at 33 and preferably locked against rotation by means of tack weld 34.

In this construction, the valve stem 6 is threaded as previously described at its upper portion at 21 and in this modification the threads 28 are made with identically the same lead as the stem threads 21 for reasons previously explained. The oppositely disposed spaced-apart yoke arms 15 permit of the insertion of split or bifurcated gland portions 35 and 36, which when assembled as shown in FIG. 4 function to compress the packing in the manner hereinafter described. The inner limits of the stuffing box packing chamber 13 are preferably, but not necessarily, defined by a stem hole bushing 37 having the usual tightening lugs 38 to hold the said stem hole bushing firmly in position. It should now become apparent that upon suitably gripping the yoke 27 after releasing the locknut 22 the said yoke may be rotated carrying with it axially its integral yoke arms 15 and yoke hub 16, whereby to similarly cause the split gland members 35 and 36 constituting the packing gland to be forced downwardly or inwardly to compress the packing within the stuffing box chamber 13. Preferably, but not necessarily, for purpose of effecting the desired positioning of the split gland members 35 and 36, the yoke bushing 31 may be recessed as at 39. The split gland members 35 and 36 as indicated at 41 are preferably annularly relieved or grooved to allow for the application of a suitable tool or other gripping means to lift out and remove the split gland members 35 and 36 when it becomes necessary to repack the stuffing box chamber 13.

It will, of course, be appreciated that the locking screw 22 in its function in holding the yoke against rotation on the threads 28 may be replaced by a split or divided construction as shown more clearly in FIG. 5, in which the lock screw 22 is replaced by the tightening screw 42 engaging the divided portions 43 and 44 of the yoke hub 45 to draw the latter member firmly around the threads 28 when it is necessary to lock said yoke against rotation. It will, of course, be appreciated that the modification shown in FIG. 5 is easily applied to the constructions shown in FIGS. 1 and 2 and also that form shown in FIG. 6.

In a further modified form of construction, shown in FIGS. 6 and 7, the yoke 11 is threadedly engaged and weld sealed with relation to the valve casing 1. In a similar manner, the stuffing box chamber 13 is provided for the valve stem 6, but in this construction, the split gland having half portions 49 and 51 is employed and is joined to the threaded yoke bushing 46 as indicated at the annular flange portion 40. It will be noted that the annular chamber 47 is defined at its upper limit by the annular projecting ridge 48 so that the gland halves 49 and 51 are firmly held together and aligned with the stuffing box chamber 13. It is noted that the upper portion of the gland means forms a U-shaped portion having a lip 48' thereon. This U-shaped portion complements the cylindrical chamber formed in the bushing, as clearly shown in FIG. 6. As shown, because of their retention by the annular projecting ridge 48 defining the cylindrical chamber 52 the split members 49 and 51 may not only be thrust downwardly or inwardly toward the stuffing box chamber to compress the packing, but upon rotation of the yoke bushing 18 in an opposite direction and upon gripping the polygonal outer portion 30 with a suitable tool or wrench, the latter member 18 is locked against rotation in the same manner as described in FIGS. 1 and 2 by means of the locking screw 22 and the soft washer 23.

The handwheel is mounted in relation to the stem as previously described.

Thus it will be apparent that after lifting the bifurcated gland out of the stuffing box and then disengaging it from the bushing recesses at 47 and chamber 52, the gland halves can be removed sideways through the space defined between the oppositely disposed yoke arms 15 whereby to allow for the repacking of the stuffing box 13. It will thus be apparent that by suitably rotating the yoke bushing 18 to move in a direction toward the stuffing box, the split gland portions comprising the members 49 and 51 will be moved into the stuffing box chamber 13 to compress the packing. In this construction similarly, it will be appreciated that the lead of the threads of the valve stem coincide with the lead of the threads on the member 18 for the same purpose as previously referred to.

In certain industries, for example, in which dangerous fluids are employed in a pipe line, the repacking of stuffing boxes under compression is generally prohibited. With this background in mind attention is now directed to a further modification shown in FIG. 8. A cap member generally designated 55 is used having the internal threads 53 for engagement with the outer threads 57 of the casing 1. As indicated, the valve stem 6 is threaded on its outer portion as indicated at 21 and threadedly engages as at 58 the threads of the said cap member 55 and is received within the chamber 54 as shown. In this construction, the threads of the threaded shank portion 57 have the same lead as the threads 21 of the stem 6 insofar as their respective leads are concerned. In this construction, the cap member 55 is shouldered at 56 and recessed at 59 to receive the gland member 61, the latter member at its inner end portion at 62 bearing against the packing in the stuffing box 13 as illustrated. To locate the axial position of the gland 61 in relation to the stuffing box packing within the chamber 13 it is only necessary to move by suitable rotation the cap 55 along the threads 57. When a suitable compression of the packing within the stuffing box chamber 13 has been established a locknut 63 is employed. It will, of course, be appreciated that the locknut 63 may be suitably replaced by the locknut construction referred to in FIG. 1 upon suitable positioning of the cap 55. It will be understood that in this construction, as formerly referred to, upon removing the handwheel 25 and the cap 55 together with the gland 61, the stuffing box 13 can then be conveniently repacked.

In summary, it will now become apparent that a convenient means for compactly providing a stuffing box construction has been obtained and further it has the advantage that such compression of the packing can be done by means overcoming the objections previously referred to herein.

While several embodiments have been shown and described, it will of course be understood that this is for purpose of illustration only and that other modifications may be employed falling within the spirit of the invention as defined by the appended claims.

We claim:

1. In a valve actuating means or the like, the combination of a valve yoke having a hub portion, a stuffing box positioned in said yoke, a yoke bushing threadedly journalled within said hub portion, a stem threadedly engaging said yoke bushing wherein the lead of the threads of said stem and yoke are the same to thereby permit independent positioning of said stem or bushing, the said stem extending through said box, a bifurcated gland means for said box, means for interlocking said bushing with said gland means whereby said bushing cooperates with said gland means to hold the latter within said box, and, locking means adapted to prevent relative rotation between said bushing and yoke.

2. The subject matter of claim 1, wherein said means for interlocking said bushing and gland means include a ridge portion on said bushing extending toward said gland means, a cylindrical chamber formed in said bushing adjacent said ridge, a flange portion defining a lower end of said chamber, said gland means including a U-shaped portion having a lip thereon adapted to be received by said chamber wherein said chamber limits the axial movement of said gland means relative to said bushing.

3. In a valve actuating means or the like, the combination including a valve casing having a threaded portion thereon, a yoke adapted to be threadedly engaged on said casing portion, a stuffing box positioned in said casing, a yoke bushing journalled within said yoke, a stem threadedly engaged in said yoke bushing wherein the lead of the threads on said stem and casing are the same to thereby permit independent positioning of said stem or yoke, said stem extending through said box, bifurcated gland means for said box adapted to be removed between the yoke upon predetermined axial movement of said yoke, a recess in said bushing adapted to receive said gland means, and, locking means on said yoke adapted to prevent relative rotation between said casing and yoke.

4. The subject matter of claim 3, wherein said locking means includes a screw threadedly positioned in said yoke adapted to secure said casing and yoke.

5. The subject matter of claim 3, wherein said locking means includes a divided yoke hub having means to secure said hub to said casing.

References Cited by the Examiner

UNITED STATES PATENTS

| | | | |
|---|---|---|---|
| 2,310,558 | 2/1943 | Teeters et al. | 251—214 |
| 2,646,959 | 7/1953 | Carver | 277—112 X |
| 3,257,095 | 6/1966 | Siver | 251—214 |

FOREIGN PATENTS 486,716  6/1938  Great Britain.

LAVERNE D. GEIGER, *Primary Examiner.*

J. S. MEDNICK, *Assistant Examiner.*